2,948,677
BIOFLOTATION TREATMENT OF OIL-CONTAINING WASTE WATER

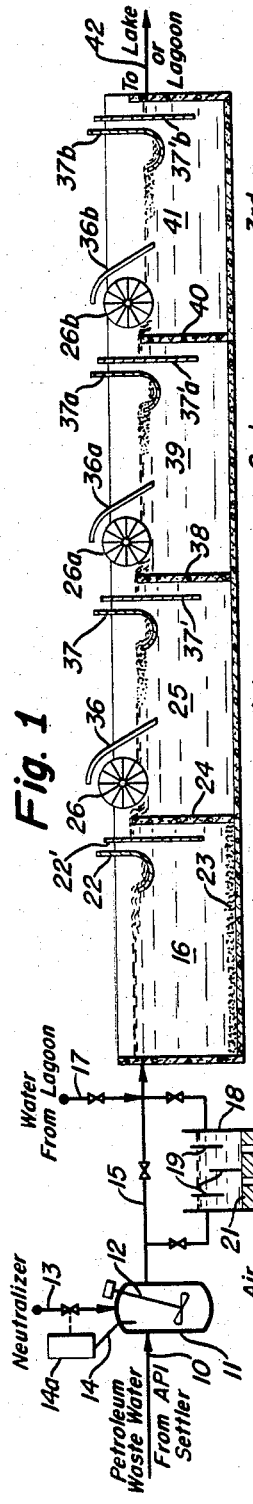

Robert J. Austin, Crete, Ill., and James F. Grutsch, Hammond, and Russell C. Mallatt, Crown Point, Ind., assignors to Standard Oil Company, Chicago, Ill., a corporation of Indiana Filed Aug. 29, 1956, Ser. No. 606,919

2 Claims. (Cl. 210—44)

This invention relates to an improved system for treating oil-containing waste water by an improved bioflotation technique and it pertains more particularly to the treatment of petroleum refinery waste water so that it may be discharged into lakes or streams without undue contamination thereof.

The problem of waste disposal in the petroleum industry has become very acute but, in spite of intensive research by those most highly skilled in the art, no simple inexpensive technique has heretofore been developed which enables the production of an effluent water which is sufficiently free from oil and obnoxious chemicals, taste, odor and bacteria to meet the strict requirements of regulatory bodies. An object of this invention is to provide such a technique. Another object is to provide an improved method and means for effecting aeration of petroleum refinery waste water. A further object is to attain the combined advantages of prior activated sludge and flotation processes while avoiding their disadvantages. Other objects will be apparent as the detailed description of the invention proceeds.

Waste disposal in the petroleum industry is discussed in a series of papers published in Industrial and Engineering Chemistry, volume 46, No. 2 (February 1954), at pages 283 to 333. Petroleum waste waters from conventional American Petroleum Institute (A.P.I.) separators contain organic matter and/or organisms which require biochemical oxidation and the biochemical oxygen demand (B.O.D.) of such waste may be of the order of about 30 to 200 or more parts per million (p.p.m.); in lakes and streams the B.O.D. is usually less than 1 p.p.m. and effluent water discharged thereto should have a B.O.D. of less than 15 p.p.m. and preferably less than about 6 p.p.m. Such secondary wastes contain oil in dissolved or solutized form to the extent of about 100 to 200 p.p.m.; it is desirable that the oil content be reduced to not more than about 30 p.p.m. and to as great an extent as possible. The phenolics content of such waste may range from about 1 to 15 p.p.m. or more and it is desirable that the phenolics be reduced to not substantially more than about .3 p.p.m. and preferably to a much lower figure. The threshold odor number (T.O.N.) of the secondary waste may be of the order of 20,000 to 50,000 or more and it should be reduced to not more than about 6,000 or lower. The extent of required purification will, of course, depend upon each particular situation. The general appearance of the waste water is also an important factor, it being desirable that the dark colored and almost black waste with an oily caste be converted into a relatively clear water of lighter and brighter color.

Our invention is preferably applied to the petroleum refinery waste discharged from the usual A.P.I. separator. We first adjust the acidity of this waste water to a level in the pH range of about 6½ to 8½, e.g. about 7 and, if necessary, adjust its temperature to a range of about 40 to 100° F., preferably about 90° F. If the waste water contains excessive amounts of sulfides, particularly $H_2S$, it is desirable to strip out $H_2S$ by passing air upwardly through the water from distributors or diffusers at the base of a preliminary stripping zone; in most cases, however, this stripping step is not required since our beaters may accomplish the required stripping. The pH adjusted stream at the defined temperature is then preferably passed through a preliminary settling zone wherein it is held for about .2 to 4 hours or more to enable removal by sedimentation and flotation of substances which can thus be removed, thereby minimizing the load on the subsequent bioflotation treatment. The bottom sediment accumulates so slowly that it may be periodically removed at intervals of about a year or more but any oil or scum should be skimmed from the top of the water leaving the preliminary settler before it is subjected to our bioflotation treatment.

In our bioflotation treatment the presettled waste water at the defined acidity and temperature is passed in series through a plurality of aerobic zones with holding times in each zone in the range of about .3 to 3 hours, preferably about 1 hour, and with an average flow rate through said zones in the range of about .1 to 10 feet per minute, preferably about .5 to 5 or 1 to 2 feet per minute. Beaters are installed at the inlet surface of each aerobic zone for beating or triturating air into the water whereby a myriad of fine bubbles are formed, dispersed and impelled into the water so that it assumes a somewhat milky appearance.

The beating may be effected by means of so-called brush aeration although for our purpose the beater or brush elements should have a width which is not substantially greater than their thickness since we want to minimize a paddle wheel effect which would cause the upper surface of the water to flow more rapidly than the main body thereof and thereby set up a more or less turbulent circulation. We have obtained outstandingly superior results with beater elements fabricated from expanded metal having sharp edges and angular openings of about ½ to 1 inch, preferably about ¾ inch, the "elements" in this case being the portions of the metal surrounding the openings and the relatively large openings minimizing the paddle wheel effect. Instead of expanded metal we may use hardware cloth, cyclone fencing, or other rigid foraminous material having square or diamond shaped openings provided that the openings are ½ to 1 inch, but these alternatives are not the full equivalent of expanded metal.

Our beaters may be fabricated by radially mounting sheets or blades of expanded metal on a central tubular shaft, the blades extending outwardly about 4 to 20 inches from the rotating shaft and being spaced at about 30° intervals and suitably braced at spaced horizontal intervals by welding discs, disc sectors, bars or rings thereto to provide strength and uniform weight balance. The beaters are rotated by electric motors or any other drive means, preferably at about 50 to 250, e.g. about 120 r.p.m.; with an 18 inch outside diameter beater the peripheral beater speed may be of the order of about 2 to 20 feet per second which is our preferred range. The immersion depth of the beaters is usually about 1 to 6 inches, preferably about 2 to 3 inches, the bearing supports for the beater shafts being preferably vertically adjustable in order to obtain the desired level of immersion.

Downwardly inclined baffles are mounted adjacent the downstream side of the beaters, preferably at an angle of about 20 to 50°, the upper edge of the baffle being above or at the approximate level of the upper part of the brush and the lower end of the baffle extending about 2 inches to a foot or more beneath the surface of the water. The purpose of the baffle is to improve aeration efficiency (note Pasveer's "Research on Activated Sludge," Sewage and Industrial Wastes, November 1953, pages 1253–1258, and December 1953, pages 1397–1404) but in our system it serves an added function of downwardly directing the liquid containing entrained air bubbles and thus substantially limiting any turbulence to the inlet end of each aerobic zone so that the liquid in the downstream portion of each zone may remain relatively quiescent. The combined action of the beater and the baffle causes the gas bubbles to be directed to the bottom of the tank so that oxidation and subsequent flotation is effected throughout substantially the entire mass of the liquid.

After the initial biological growth period which may require several weeks, particles which may be called sludge but are better described as slime appear and grow, a relatively small part tending to be internally recycled at the inlet end of each aerobic zone and a larger part accumulating in bulk in the downstream portion of the zone. This biological slime functions in a manner analogous to sludge in accelerating both chemical and biological oxidation so that most of the oxygen content of the entrained bubbles is effectively utilized. The slime particles apparently provide nuclei or absorbtive floc for coalescing oil and entrained organic matter and at the same time they tend to occlude the nitrogen and unused portion of the oxygen, the occluded gas tending to make the particles sufficiently buoyant so that they float to the surface of the liquid in the downstream quiescent section of the aerobic zones. We have found that for best results it is essential to provide a holding period of at least about .3 hour in order to effectively utilize the entrained oxygen and that it is also essential to remove the slime which is floated to the surface because if this slime becomes deaerated it will sink back into the liquid and/or accumulate on the bottom of the zone, thereby decreasing the effectiveness of the treatment. By limiting the holding period to approximately 1 hour, we can effectively utilize the oxygen content and at the same time recover substantially all of the resulting oily slime from the surface of the water by a skimmer. The technique thus defined enables a large part of the impurities to be removed without necessity of biological or chemical oxidation thus enormously minimizing the overall oxygen requirements of the treating system.

The number of aerobic zones employed will depend on the nature of the waste water and the requirements for final effluent purity. We prefer to employ at least three zones in series and in one commercial design five such zones are utilized. Each zone is preferably from about 15 to 300, preferably about 50 to 200, feet in length with a water depth of about 3 to 10 feet and with a width to provide the beater length necessary for incorporating the required amount of oxygen and flotation gas in said zone, 1 foot of beater length usually being adequate to incorporate about 6 to 10 pounds per day of oxygen and 24 to 40 pounds of inert gases into the water. The inlet to each zone is preferably from near the bottom of the preceeding zone after slime is skimmed therefrom.

Total beater length which may be divided up into a plurality of stages is about 1 foot for each 5 to 100 gallons per minute of waste water to be treated depending upon the extent of treatment required.

The invention will be more clearly understood from the following detailed description of a specific example thereof read in conjunction with the accompanying drawings which form a part of this specification and in which:

Figure 1 is a schematic vertical section of our treating system,

Figure 2 is a schematic top view thereof,

Figure 3 is a schematic vertical section of a beater,

Figure 4 is a transverse section taken along the lines 4—4 of Figure 3,

Figure 5 is a schematic plan view of an alternate bioflotation treating system, and Figure 6 is a detailed section illustrating an adjustable mounting for the beater assembly.

While our invention may be useful in the treatment of any oil-containing waste water whether the oil be of animal, mineral or vegetable origin, it must be recognized that different types of waste waters present different problems and our invention is particularly applicable to the treatment of petroleum refinery waste water discharged from A.P.I. separators. Such waste water may be charged, for example, through line 10 to neutralizer vessel 11 provided with a motor driven stirrer 12 such as a Lightnin mixer and a neutralizing agent, such as aqueous sodium hydroxide, is introduced into the mixing vessel through line 13 at a rate to bring the acidity of the waste water to a level in the pH range of 6½ to 8½, e.g. about 7. A pH determining instrument 14 may be connected to a suitable recorder 14a and the rate of caustic introduction may be manually or automatically controlled in accordance with the indicated pH by known mechanisms. If the waste water is on the alkaline rather than on the acid side, a suitable acid such as sulfuric acid is introduced through line 13 instead of aqueous sodium hydroxide.

The pH adjusted water is then introduced by line 15 to the presettling zone 16 and the temperature of the water in the presettling zone should be in the range of about 40 to 100° F., preferably about 90° F. since that temperature favors the biological growth in the subsequent bioflotation step. Where the waste water is at higher temperatures, it is preferably cooled by introducing cold water from a lagoon or other source through line 17. Colder waste water may be heated to the desired temperature by means of steam coils or in any other conventional manner.

When the waste water contains large amounts of sulfides, particulary $H_2S$, it may be desirable to pass it through a hydrogen sulfide stripper 18 before it enters presettler 16. Any conventional type of stripper may be employed such, for example, as a tank provided with suitable baffles 19, an air inlet 29 and a suitable air distributor such as diffuser plates 21.

Presettler 16 may be a cement lined channel with side walls about 6 to 10 feet high to accommodate a usual water depth of about 4 to 5 feet, the channel being about 12 feet wide and the settling zone being about 100 feet long. With the waste water inlet of about 1 million gallons per day, the presettler will thus provide a holding time of about 1 hour and a flow rate of about 1.6 feet per minute. A skimmer 22 is provided adjacent the downstream side of the presettler for removing any oil or other matter which rises to the surface in the presettler. Baffle 22' extends from above the surface of the water to the lower part of the tank but is spaced from the bottom thereof. Solids 23 may accumulate at the base of the presettler but at a very low rate of only a few inches per year so that usually there is no necessity for continuous removal thereof.

The skimmed water flows from beneath baffle 22' over the weir or dam 24 into the first bioflotation zone 25 which in this example is the same size and shape as the presettler. Beater 26 is mounted to rotate counterclockwise with the beater elements extending about 2 to 3 inches below the surface of the water. The beater of this example is shown more clearly in Figures 3 and 4 and it consists of a transverse horizontal tubular shaft 27 mounted in vertically adjustable bearings 28 and provided with a driving means 29. In this example the tubular shaft is about 4 inches in diameter and 12 outwardly extending (radial, tangential or the like) strips 30 of expanded metal are welded or otherwise secured to the shaft at 30° intervals, the width of each strip being 7 inches and the horizontal length of the strips (i.e. of the beater) being about 10 feet. For additional firmness supports in the form of annular rings 31 or disc sectors are welded to the expanded metal strips or blades at spaced intervals, the beater being carefully weight-balanced to prevent vibration at high speeds of rotation.

The expanded metal strips are preferably fabricated from corrosion resistant steel and are characterized by relatively sharp edges and diamond shaped openings of about ¾ inch. The overall beater is thus about 18 inches in diameter and when rotated at about 120 r.p.m. it will provide a peripheral speed of about 10 feet per second. A method of mounting the beater bearings for vertical adjustment is illustrated in Figure 6, I-beams 32 being vertically secured to concrete piers and an L-shaped bearing support 33 being adjustable upwardly or downwardly by cable 34 for raising and lowering bearing support 35. Baffle 36 is likewise supported on the L-shaped member 33, the upward end of the baffle being above the beater and the lower end extending downwardly at an angle of about 40° a few inches below the lower level of the beater (about 6 inches below the surface of the water). The baffle may be approximately 3 inches from the periphery of the beater at its closest point.

When beater brush 26 is rapidly rotated as hereinabove described air is dispersed into the water in the form of myriads of minute bubbles and the water containing such bubbles is impelled downwardly toward the bottom of the tank at the inlet end of zone 25, partly because of the impelling action of the expanded metal beater blades and partly because of the deflecting action of baffle 36. For best results the entrained air bubbles should be extremely small in size but large in number and should give the water a somewhat milky appearance. These bubbles become affixed to slime particles previously formed and internally circulated at the inlet end of the zone but most of the particles flow downstream and are gradually buoyed or floated to the surface while the bacterial oxidation is taking place. Oil and other organic contaminants apparently are coalesced on the slime or biologically induced floc particles and likewise buoyed upwardly by the unconsumed portion of the aerating gas. It is important that the holding time in zone 25 be at least about .3 hour in order to effectively utilize the oxygen impelled into the water but it is likewise important that the oily slime material be removed from the surface of the water by skimmer 37 before it becomes sufficiently deaerated to settle back into the liquid, i.e. the holding time should not be in excess of about 3 hours and is preferably about 1 hour. The horizontal average flow rate of about 1.6 feet per minute provides the required quiescence for the flotation. The oily slime is removed by skimmer 37 and the water is withdrawn from the bottom of the tank under baffle 37' so that any settling solids are carried over to the next zone. It is desirable to prevent accumulation of solids at the bottom of the aeration zones.

Another weir or dam 38 separates the first bioflotation zone 25 from the second bioflotation zone 39 which is provided with a beater 26a, baffle 36a, skimmer 37a and baffle 37'a which function in the same manner as beater 26, baffle 36, skimmer 37 and baffle 37', respectively. In the second bioflotation zone there is a further reduction of impurities in the waste water but usually a lesser reduction than accomplished in the first zone. The skimmed water from the second bioflotation zone 39 flows over weir or dam 40 into the third bioflotation zone 41 which is provided with beater 26b, baffle 36b, skimmer 37b and baffle 37'b, the size, arrangement and operation of this zone being as heretofore described in connection with the first zone. The final effluent which leaves the system through line 42 is of such purity that it may be introduced into a sufficiently large lake or stream without further purification. In some situations it may be necessary to provide a number of additional bioflotation stages and/or to discharge the final effluent into a pond of large surface area so that the final oxidation may be thus effected in accordance with known technique.

In Figure 5 we have shown an alternate flow plan wherein the petroleum waste water after pH adjustment is introduced into a settling zone 43 provided with skimmer 44 and baffle 44', then passed over weir 45 under beater 46 and baffle 47 into the first bioflotation zone 48 and thence in a similar manner through bioflotation zones 49, 50, 51 and 52, the treated water being withdrawn through line 53. In this system the required length of zones is attained by back and forth flow through adjacent channels and this or similar systems may be employed depending upon the space available for the treating unit. In this system as well as in the previously described system the skimmings from all zones are removed either continuously or at frequent intervals. These skimmings are largely water but may contain about 1 to 10 percent of oil, .2 to 3 percent ash and about .5 to 5 percent of biological slime. The skimmings may be dewatered and dried by any known mechanical and/or chemical technique and then burned or may be disposed of in any other known manner.

As an example of results obtainable by our bioflotation process, a test was made in adjacent channels by flowing equivalent portions of waste water through 3 zones each having a detention time of 1½ hours and each being geometrically the same as the other. In the so-called gravity channel each of the zones was simply employed as a settling zone while in the so-called aerated side the first of the zones was employed as a settler and the next two zones were provided with beaters and adjacent baffles substantially as hereinabove described. Initially there was no substantial difference in the purification accomplished in the gravity side and the aerated side respectively but after a few weeks operation the biological life appeared in the aerated side of the tank and after biological slime had accumulated, the following data were obtained:

| Characteristics | Feed | First 1½ Hour Zone | Second 1½ Hour Zone | Third 1½ Hour Zone |
| --- | --- | --- | --- | --- |
| B.O.D., p.p.m.: | | | | |
| Gravity Side | 62 | 51 | 48 | 46 |
| Aerated Side | 62 | 51 | 12 | 6 |
| T.O.N.: | | | | |
| Gravity Side | 19,000 | 16,000 | 16,000 | 13,000 |
| Aerated Side | 19,000 | 16,000 | 10,000 | 6,000 |
| Oil, p.p.m.: | | | | |
| Gravity Side | 118 | 71 | 76 | 53 |
| Aerated Side | 118 | 71 | 38 | 30 |
| Phenolics, p.p.m.: | | | | |
| Gravity Side | 1.34 | .81 | 1.04 | 1.26 |
| Aerated Side | 1.34 | .81 | .36 | .31 |

It is obvious that by employing additional bioflotation zones the waste water could be further purified to meet more stringent effluent quality requirements. The skimmings removed from the bioflotation zones were found to contain about 92 percent water, 3.8 percent oil, 1.2 percent ash and about 3 percent of biological slime. By keeping the extent of aeration, the holding time and the flow rate, pH, temperature, etc. within the limit hereinabove set forth, it is thus possible to obtain remarkably effective purification at about one-third to one-fourth of the investment cost that would be required for obtaining similar results by other known methods. The effluent is relatively clear and bright.

It will be noted that the bioflotation process hereinabove described does not require the use of added flotation materials. On the contrary, it employs the buoyed slime itself to serve this function. This is a radical departure from prior flotation techniques and it likewise is distinctly different from activated sludge processes heretofore employed; it attains the advantages but avoids the disadvantages of these separate and distinct prior processes. It should be understood, however, that in some cases it may be advantageous to add a known type of floc forming chemical agent such as alum, ferric sulfate, activated silica, etc. or other known type of surface active material provided that the added material does not impair the effectiveness of the biological action and provided that it is actually beneficial in increasing the flotation of impurities to be eliminated. The buoyancy effect of residual nitrogen or unused aeration gas for improving the effectiveness of flotation may be applied to improve the effectiveness of other gravity settling systems much in the manner in which such buoyancy is utilized in our bioflotation process.

While we have described a particular example of our invention in considerable detail, it should be understood that alternative arrangements, steps and conditions will be apparent from the foregoing description to those skilled in the art. Baffles 22', 37', 37'a, 37'b and 44' may depend from or be integrally associated with skimmers 22, 37, 37a, 37b and 44 respectively. Advantageous results may be obtained by the use of previously known types of brush aerators even though such brush aerators are not necessarily the equivalent of our beater, particularly when the so-called brush aerators are provided with blades which unduly augment the paddle wheel effect. Brush elements may, for example, be relatively rigid rods or wires of metal or plastic (such as nylon or other known materials) or natural fibers provided that they are effective in producing and impelling into the body of the water the myriad of air bubbles of desired smallness. The outside diameter of the beaters may range from about 10 inches to 5 feet or more.

We claim:

1. The method of treating oil-refinery waste water containing oil in dispersed form which comprises adjusting its acidity to a level in the pH range of about 6½ to 8½, passing said oil refinery waste water at a temperature in the range of about 40 to 100° F. in series through a plurality of aerobic zones with holding times in each zone in the range of about .3 to 3 hours, triturating air into the water at the upper surface of the water in a horizontal area extending across the upper inlet end of each of said zones to form, disperse and impel downwardly therein a myriad of fine air bubbles, restricting any increased surface flow rate and turbulence caused by the beating step to the inlet end of each zone whereby the water downstream therefrom is relatively quiescent so that growth of bacterial slime is promoted, oil and organic matter coalesce thereon and oil-slime particles are buoyed to the surface by residual components of entrapped air bubbles, skimming floating accumulated oily slime from the upper part of each zone so that substantially scum-free water is discharged therefrom and employing an average flow rate through said zones in the range of about .1 to 10 feet per minute.

2. A method of treating oil refinery waste water containing organic matter and oil in dispersed form which comprises passing said oil refinery waste water at a temperature of 40° to 100° F. through an aerobic zone having an inlet and an outlet; triturating air into said waste water at the upper surface of said waste water and at the inlet end of said aerobic zone to form, disperse, and impell downwardly therein a myriad of finely divided and highly dispersed air particles; limiting turbulence to said inlet end of said aerobic zone so that said waste water in the downstream portion of said aerobic zone remains quiescent so that oxidation and subsequent flotation is effected throughout said waste water and whereby slime particles coalesce said oil and said organic matter and whereby the combined oil and slime occlude said air and whereby the oil, slime and air are buoyed to the surface of said waste water; skimming said oil, slime and air from the surface of said waste water, and subsequently withdrawing water which is reduced in oil and organic matter content from said outlet of said aerobic zone.

References Cited in the file of this patent

UNITED STATES PATENTS

| | | |
|---|---|---|
| 729,297 | Edson | May 26, 1903 |
| 1,525,394 | Jolicoeur | Feb. 3, 1925 |
| 1,843,647 | Bramley-Moore | Feb. 2, 1932 |
| 1,893,623 | Imhoff | Jan. 10, 1933 |
| 2,058,785 | Goudey et al. | Oct. 27, 1936 |
| 2,094,909 | Bailey et al. | Oct. 5, 1937 |
| 2,129,267 | Fischer | Sept. 6, 1938 |
| 2,242,639 | Barton | May 20, 1941 |
| 2,281,609 | Walter | May 5, 1942 |
| 2,322,017 | Hartman | June 15, 1943 |
| 2,370,974 | Langdon | Mar. 6, 1945 |
| 2,684,941 | Pasveer | July 27, 1954 |
| 2,766,203 | Brown et al. | Oct. 9, 1956 |
| 2,798,042 | Cox | July 2, 1957 |

FOREIGN PATENTS

| | | |
|---|---|---|
| 363,267 | Germany | Nov. 6, 1922 |